(12) United States Patent
Hokazono

(10) Patent No.: US 11,247,512 B2
(45) Date of Patent: Feb. 15, 2022

(54) TIRE

(71) Applicant: SUMITOMO RUBBER INDUSTRIES, LTD., Hyogo (JP)

(72) Inventor: Hiroki Hokazono, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 499 days.

(21) Appl. No.: 16/135,735

(22) Filed: Sep. 19, 2018

(65) Prior Publication Data

US 2019/0100060 A1   Apr. 4, 2019

(30) Foreign Application Priority Data

Oct. 3, 2017 (JP) .............................. JP2017-193680

(51) Int. Cl.
*B60C 11/11* (2006.01)
*B60C 11/12* (2006.01)
(Continued)

(52) U.S. Cl.
CPC ........ *B60C 11/1353* (2013.01); *B60C 1/0016* (2013.01); *B60C 11/0309* (2013.01);
(Continued)

(58) Field of Classification Search
CPC . B60C 11/1353; B60C 11/0309; B60C 11/11; B60C 11/1369; B60C 11/1236; B60C 2011/1361; B60C 2011/0346
See application file for complete search history.

(56) References Cited

U.S. PATENT DOCUMENTS 3,727,661 A * 4/1973 Hoke .................... B60C 11/032
152/209.22
5,361,815 A * 11/1994 Loser .................. B60C 11/0306
152/209.19
(Continued)

FOREIGN PATENT DOCUMENTS

JP     04-024105 A  *  1/1992
JP     06-099705 A  *  4/1994
(Continued)

OTHER PUBLICATIONS

Machine translation for Japan 2017-030513 (Year: 2021).*
(Continued)

*Primary Examiner* — Steven D Maki
(74) *Attorney, Agent, or Firm* — Greenblum & Bernstein, P.L.C.

(57) ABSTRACT

A tire comprises a tread portion having at least one main groove extending in a zigzag manner in a tire circumferential direction. The main groove includes first inclined portions and second inclined portions arranged alternately in the tire circumferential direction. The first inclined portions are inclined in a first direction and the second inclined portions are inclined in a second direction opposite to the first direction with respect to the tire circumferential direction. A length of each of the first inclined portions is larger than a length of each of the second inclined portions. The main groove is provided in a groove bottom thereof with projecting portions extending in a groove width direction of the main groove. The projecting portions includes first projecting portions arranged in the first inclined portions.

19 Claims, 5 Drawing Sheets

(51) Int. Cl.
    *B60C 11/13* (2006.01)
    *B60C 11/03* (2006.01)
    *B60C 1/00* (2006.01)

(52) U.S. Cl.
    CPC ............ *B60C 11/11* (2013.01); *B60C 11/1204* (2013.01); *B60C 11/1236* (2013.01); *B60C 11/1369* (2013.01); *B60C 2011/0346* (2013.01); *B60C 2011/0358* (2013.01); *B60C 2011/1213* (2013.01); *B60C 2011/1361* (2013.01)

(56) References Cited

U.S. PATENT DOCUMENTS

| | | | | |
|---|---|---|---|---|
| 5,957,180 | A | * | 9/1999 | Kuramochi ............ B60C 11/12 152/209.21 |
| D800,641 | S | * | 10/2017 | Bonitas ........................ D12/600 |
| 2010/0078105 | A1 | * | 4/2010 | Hashimoto ......... B60C 11/0306 152/209.18 |
| 2016/0089939 | A1 | | 3/2016 | Oji |
| 2019/0184762 | A1 | * | 6/2019 | Wada .................. B60C 11/1204 |

FOREIGN PATENT DOCUMENTS

| | | | |
|---|---|---|---|
| JP | 2016-064781 A | | 4/2016 |
| JP | 2017-030513 A | * | 2/2017 |

OTHER PUBLICATIONS

Machine translation for Japan 06-099705 (Year: 2021).*
Machine translation for Japan 04-024105 (Year: 2021).*
U.S. Appl. No. 16/106,842 to Tomoyuki Kujime et al., which was filed Aug. 21, 2018.
U.S. Appl. No. 16/204,509 to Shoichi Wada, which was filed Nov. 29, 2018.

* cited by examiner

TIRE

TECHNICAL FIELD

The present invention relates to a tire, specifically, to a tire suitable for running on a snowy road.

BACKGROUND ART

Conventionally, in order to improve running performance on a snowy road surface (hereinafter referred to as "on-snow performance"), there has been known a tire having a tread portion provided with main grooves extending in a zigzag manner in a tire circumferential direction.

For example, Japanese Patent Application No. 2016-064781 (Patent Literature 1) has proposed a tire which generates large snow shearing force by having first shoulder main groove portions and second shoulder main groove portions arranged alternately in the tire circumferential direction, wherein each of the first shoulder main groove portions is inclined with respect to the tire circumferential direction and each of the second shoulder main groove portions is inclined to an opposite direction to each of the first shoulder main groove portions and has a smaller length in the tire circumferential direction than that of each of the first shoulder main groove portions.

SUMMARY OF THE INVENTION

However, it has been difficult to satisfy the demand on the on-snow performance which has been increasing year by year by focusing only on improving the snow shearing force by the zigzag main grooves as in the tire disclosed in Patent Literature 1. Thereby, even in the tire disclosed in Patent Literature 1, further improvement has been demanded in order to further improve the on-snow performance of the tire.

The present invention was made in view of the above, and a primary object thereof is to provide a tire capable of further improving the on-snow performance.

In one aspect of the present invention, a tire comprises a tread portion comprising at least one main groove extending in a zigzag manner in a tire circumferential direction, wherein the main groove includes first inclined portions and second inclined portions arranged alternately in the tire circumferential direction, the first inclined portions are inclined in a first direction with respect to the tire circumferential direction and the second inclined portions are inclined in a second direction opposite to the first direction with respect to the tire circumferential direction, a length of each of the first inclined portions is larger than a length of each of the second inclined portions the main groove is provided in a groove bottom thereof with projecting portions extending in a groove width direction of the main groove, and the projecting portions include first projecting portions arranged in the first inclined portions.

In another aspect of the invention, it is preferred that the main groove has first intersecting portions each connecting between one of the first inclined portions and one of the second inclined portions adjacent thereto, a distance between one of the first projecting portions and one of the first intersecting portions adjacent thereto is not more than 30% of the length of each of the first inclined portions.

In another aspect of the invention, it is preferred that the main groove has second intersecting portions each connecting between one of the first inclined portions and one of the second inclined portions adjacent thereto on an inner side in a tire axial direction of the first intersecting portions, and each of the second inclined portions has a stone ejector formed at an end portion of a groove wall thereof on a side of respective one of the second intersecting portions.

In another aspect of the invention, it is preferred that the stone ejector is formed in a stepwise shape.

In another aspect of the invention, it is preferred that each of the first projecting portions includes a pair of projections arranged to be spaced apart from each other in a direction along a center line of respective one of the first inclined portions.

In another aspect of the invention, it is preferred that a distance between the projections in each pair thereof is in a range of from 45% to 80% of a groove width of each of the first inclined portions.

In another aspect of the invention, it is preferred that each of the projections is arranged at an angle in a range of from 80 to 100 degrees with respect to the center line of respective one of the first inclined portions.

In another aspect of the invention, it is preferred that each of the projections has a substantially rectangular shape elongated in the groove width direction of respective one of the first inclined portions in a plan view of the tread portion, and a width of each of the projections is in a range of from 20% to 30% of a length of each of the projections.

In another aspect of the invention, it is preferred that a height of each of the projections is in a range of from 10% to 30% of a groove depth of each of the first inclined portions.

In another aspect of the invention, it is preferred that the projecting portions include second projecting portions arranged in the second inclined portions.

In another aspect of the invention, it is preferred that the tread portion has land regions divided by the main groove, the land regions are provided with sipes each connected at a connecting portion respectively thereof with the main groove, and each of the projecting portions is provided in the vicinity of the connecting portion of one of the sipes.

In another aspect of the invention, it is preferred that the main groove has predetermined pitch lengths each including a pair of the first inclined portion and the second inclined portion, each of the projecting portions is provided at a position within 25% of one of the pitch lengths from the connecting portion of one of the sipes adjacent thereto.

DESCRIPTION OF THE PREFERRED EMBODIMENT

An embodiment of the present invention will now be described in detail in conjunction with accompanying drawings.

Figure 1:
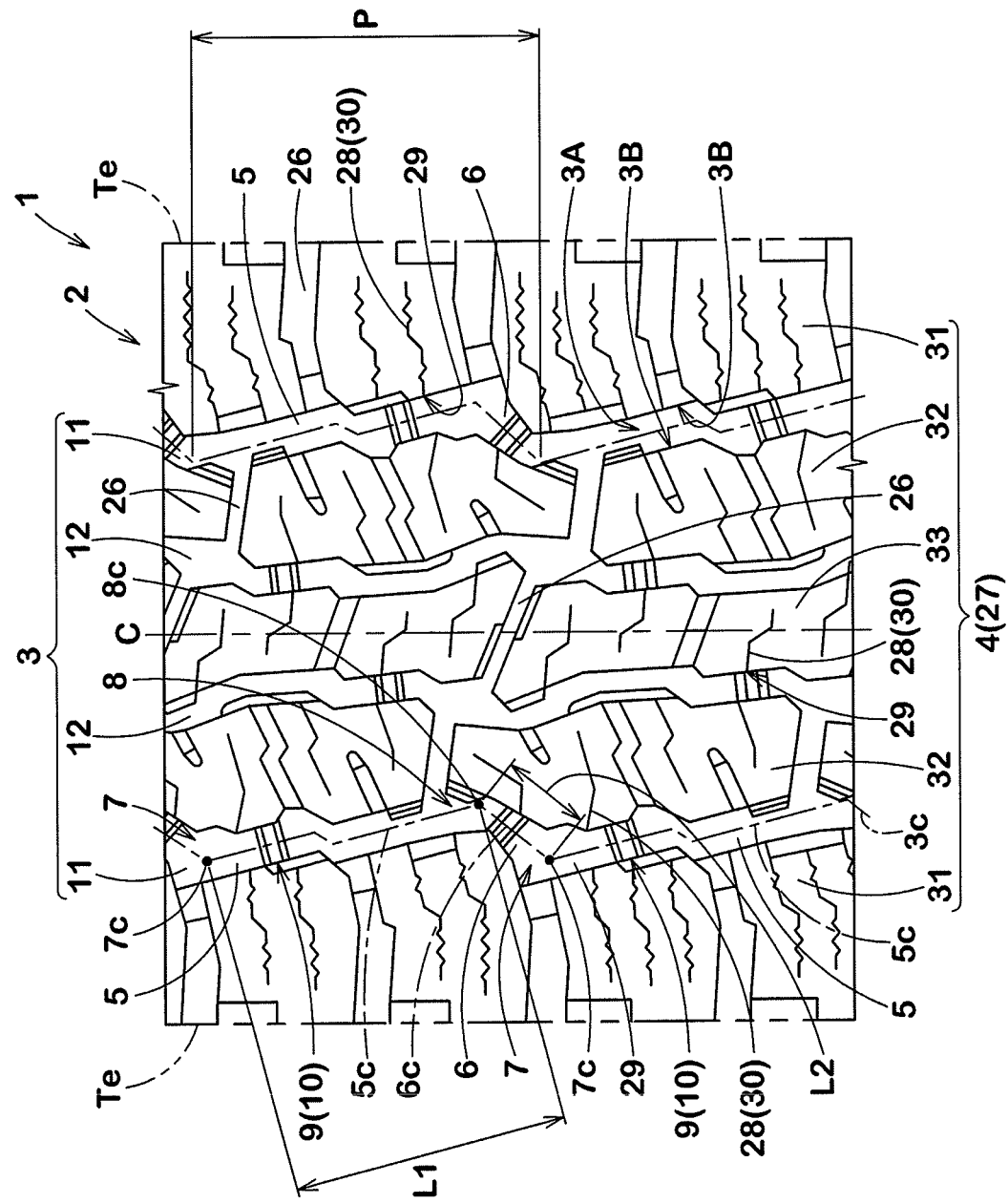
FIG. 1 is a development view of a tread portion of a tire as an embodiment of the present invention.

FIG. 1 is a development view of a tread portion 2 of a tire 1 in this embodiment. The tire 1 in this embodiment is suitably used as a pneumatic tire for SUV (sport utility vehicle) suitable for running on rough terrain, for example. As shown in FIG. 1, in the tire 1 in this embodiment, the tread portion 2 is provided with at least one main groove 3, a plurality of the main grooves 3 in this embodiment, extending in a zigzag manner in the tire circumferential direction and land regions 4 divided by the main groove 3.

It is preferred that each of the main grooves 3 has first inclined portions 5 and second inclined portions 6 arranged alternately in the tire circumferential direction. Each of the first inclined portions 5 is inclined in a first direction with respect to the tire circumferential direction and each of the second inclined portions 6 is inclined in a second direction opposite to the first direction with respect to the tire circumferential direction. Each of the main grooves 3 in this embodiment has, as portions connecting between the first inclined portions 5 and the second inclined portions 6, first intersecting portions 7 protruding most to one side in a tire axial direction and second intersecting portions 8 protruding most to the other side in the tire axial direction. It is preferred that the first intersecting portions 7 and the second intersecting portions 8 are arranged alternately in the tire circumferential direction.

Each of the main grooves 3 has predetermined pitch lengths (P) each including a pair of the first inclined portion 5 and the second inclined portion 6, for example. Here, the pitch lengths (P) are the lengths along the tire circumferential direction. The pitch lengths (P) may be all the same or different in the tire circumferential direction. In this embodiment, pitch variation in which plural types of pitch lengths (P) different in length are randomly arranged is adopted.

In this embodiment, a length L1 of each of the first inclined portions 5 is larger than a length L2 of each of the second inclined portions 6. Here, the length L1 of each of the first inclined portions 5 is the distance between a center position (7c) of respective one of the first intersecting portions 7 and a center position (8c) of respective one of the second intersecting portions 8 in the each of the first inclined portions 5. Further, the length L2 of each of the second inclined portions 6 is the distance between the center position (7c) of respective one of the first intersecting portions 7 and the center position (8c) of respective one of the second intersecting portions 8 in the each of the second inclined portions 6.

Note that the center position (7c) of each of the first intersecting portions 7 is an intersection point of a center line (5c) of respective one of the first inclined portions 5 and a center line (6c) of respective one of the second inclined portions 6 in the each of the first intersecting portions 7. Further, the center position (8c) of each of the second intersecting portions 8 is an intersection point of the center line (5c) of respective one of the first inclined portions 5 and the center line (6c) of respective one of the second inclined portions 6 in the each of the second intersecting portions 8. The tire 1 having the main grooves 3 configured as such can generate large snow shearing force by the first inclined portions 5 and the second inclined portions 6 having different angles with respect to the tire circumferential direction when running on a snowy road surface, therefore, it is possible that the on-snow performance is improved.

Each of the main grooves 3 in this embodiment has a groove bottom 3A and a pair of groove walls 3B extending outwardly in a tire radial direction from the groove bottom 3A. In the groove bottom 3A, it is preferred that projecting portions 9 extending in a groove width direction of respective one of the main grooves 3. Here, the groove width direction of the main groove 3 is a direction orthogonal to a center line (3c) of the respective main groove 3 at each position thereof. Note that the center line (3c) of each of the main grooves 3 includes at least the center lines (5c) of the first inclined portions 5 and the center lines (6c) of the second inclined portions 6 respectively thereof.

With the main grooves 3 configured as such, owing to shearing of snow and edge effect by the projecting portions 9, traction when running on a snowy road surface is improved. Further, the projecting portions 9 discharge stones and the like which are stuck in the main grooves 3, while suppressing stones and the like from getting stuck in the main grooves 3, therefore, it is possible that stone biting resistance performance is improved. The stone biting resistance performance is evaluated by the number of stones stuck in the main grooves 3 after running for a certain distance. Furthermore, the projecting portions 9 increase rigidity of the land regions 4, therefore, it is possible that steering stability of the tire 1 during running on a dry road surface is improved.

The projecting portions 9 in this embodiment include first projecting portions 10 disposed in the first inclined portions 5. The first projecting portions 10 configured as such are formed in the first inclined portions 5 each having a small angle with respect to the tire circumferential direction, therefore, the snow shearing force and the edge effects by the first projecting portions 10 are greatly exerted in a direction of the traction, thereby it is possible that the on-snow performance of the tire 1 is further improved.

In a preferred embodiment, the main grooves 3 include at least one shoulder main groove 11 arranged on a side of one of tread edges (Te), a plurality of the shoulder main grooves 11 in this embodiment each arranged on a side of respective one of the tread edges (Te), and at least one crown main groove 12 arranged on a side of a tire equator (C) of the at least one shoulder main groove 11, a plurality of the crown main grooves 12 in this embodiment, each arranged on a side of the ti re equator (C) of respective one of the shoulder main grooves 11. A pair of the crown main grooves 12 may be arranged on both sides in the ti re axial direction, one on each side, of the tire equator (C), for example.

Here, the "tread edges (Te)" are defined as outermost ground contacting positions in the tire axial direction when the tire 1 in a standard state is in contact with a flat surface with zero camber angles by being loaded with a standard tire load. The center position in the tire axial direction between the tread edges (Te) is the "tire equator" (C).

The "standard state" is a state in which the tire 1 is mounted on a standard rim (not shown), inflated to a standard inner pressure, and loaded with no tire load. Hereinafter, dimensions and the like of various parts of the tire 1 are those measured under the standard state, unless otherwise noted.

The "standard rim" is a wheel rim specified for the concerned ti re by a standard included in a standardization system on which the tire 1 is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire 1 is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire 1 is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The land regions 4 in this embodiment include shoulder land regions 31, middle land regions 32, and a crown land region 33. Each of the shoulder land regions 31 is defined as a region on an outer side in the tire axial direction of respective one of the shoulder main grooves 11, for example. Each of the middle land regions 32 is defined between one of the shoulder main grooves 11 and its adjacent one of the crown main grooves 12, for example. The crown land region 33 is defined as a region between the pair of the crown main grooves 12, for example.

Figure 2:
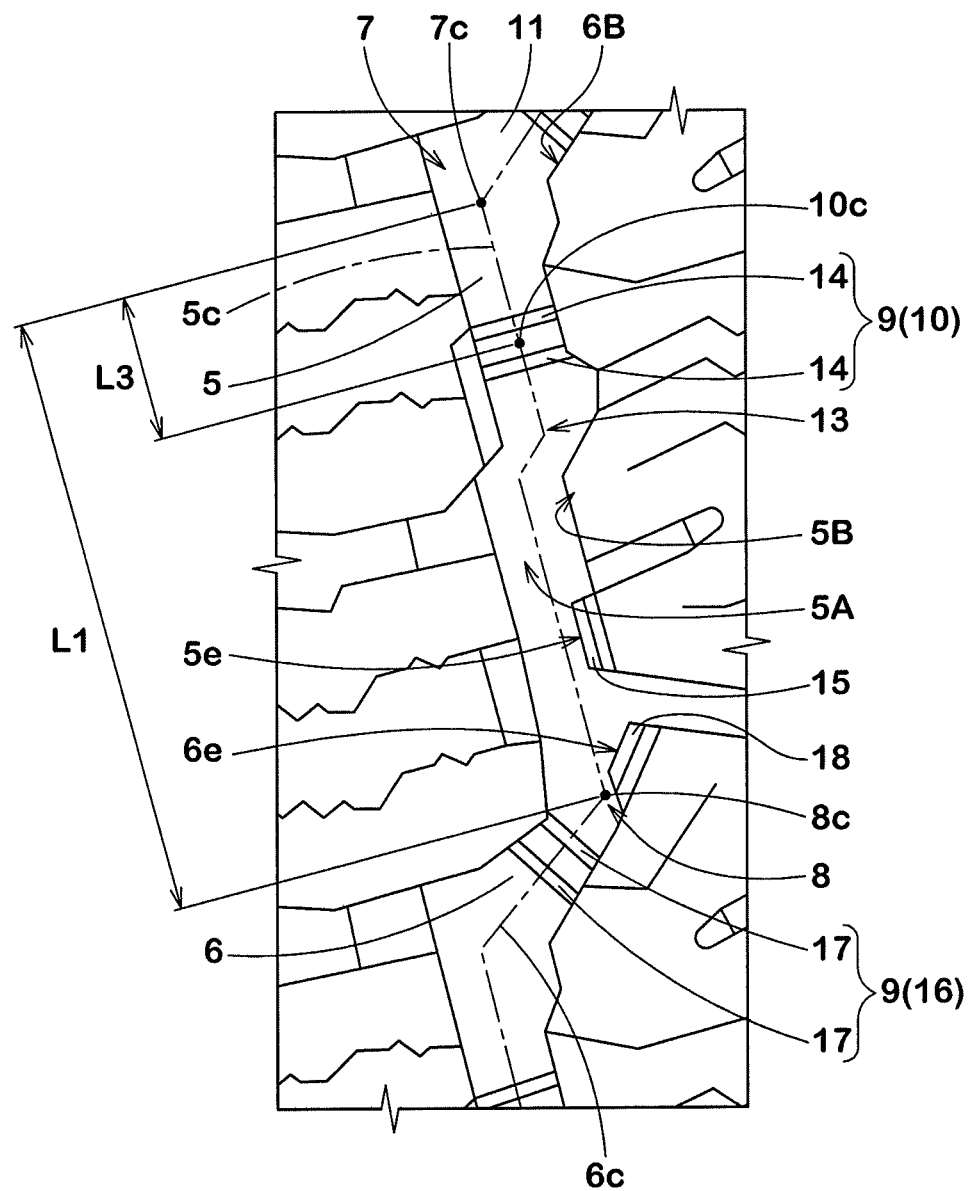
FIG. 2 is an enlarged partial view of one of shoulder main grooves of FIG. 1.
Figure 3:
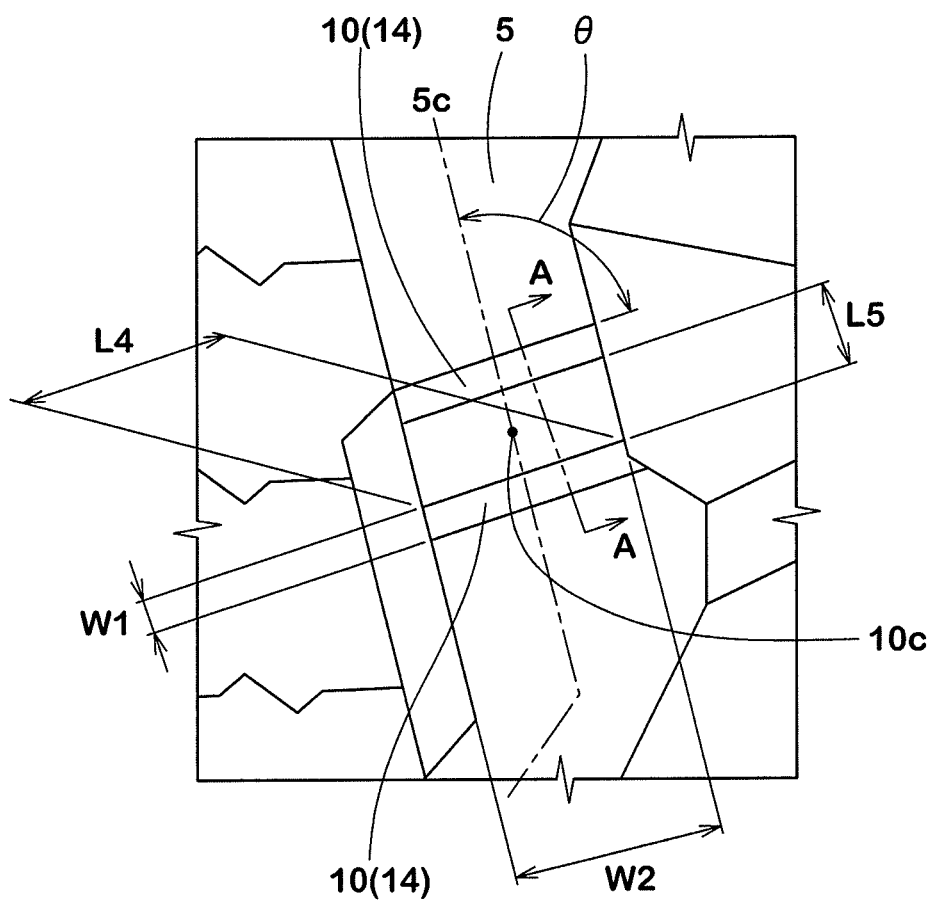
FIG. 3 is an enlarged partial view of one of first projecting portions of FIG. 2.
Figure 4:
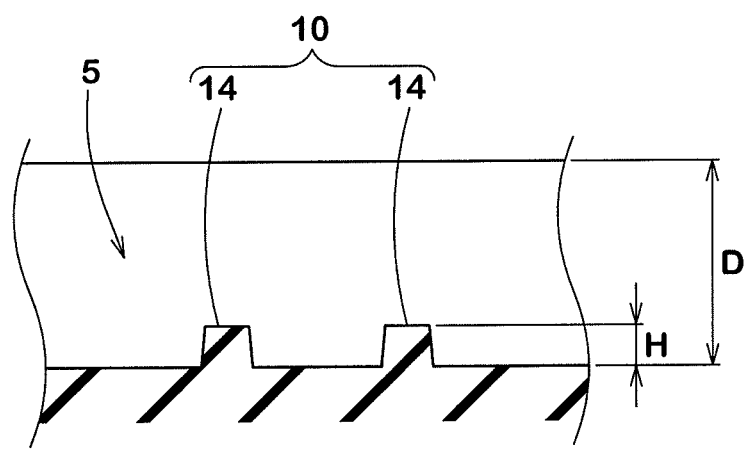
FIG. 4 is a cross-sectional view taken along A-A line of FIG. 3.

FIG. 2 is an enlarged partial view of one of the shoulder main grooves 11, and FIG. 3 is an enlarged partial view of one of first projecting portions 10 of FIG. 2. Further, FIG. 4 is a cross-sectional view taken along A-A line of FIG. 3. As shown in FIGS. 2, 3, and 4, each of the shoulder main grooves 11 in this embodiment has the first inclined portions 5, the second inclined portions 6, the first intersecting portions 7, and the second intersecting portions 8 as described above.

Each of the first inclined portions 5 includes a first bent portion 13, for example. It is preferred that the first bent portion 13 has a size that does not hinder movement of the snow in the respective first inclined portions 5 in a longitudinal direction thereof. with the shoulder main grooves 11 configured as such, when running on a snowy road surface, snow in each of the shoulder main grooves 11 is compressed toward the respective first intersecting portion 7 and the respective second intersecting portion 8, therefore, it is possible that hard snow blocks are formed. Note that each of the second intersecting portions 8 in this embodiment is arranged on an inner side in the tire axial direction of respective one of the first intersecting portions 7.

It is preferred that a distance L3 between the first projecting portion 10 formed in each of the first inclined portions 5 and respective one of the first intersecting portions 7 is not more than 30% of the length L1 of each of the first inclined portions 5. Here, the distance L3 between the first projecting portion 10 and the first intersecting portion 7 is the distance between a center position (10c) of respective one of the first projecting portions 10 and the center position (7c) of the respective one of the first intersecting portions 7.

Note that the center position (10c) of each of the first projecting portions 10 is the center position of the respective first projecting portion 10 along the center line (5c) of the respective first inclined portion 5 and is the point on the center line (5c) of the respective first inclined portion 5. The first projecting portions 10 configured as such are formed near the first intersecting portions 7, therefore, it is possible that stones and the like are suppressed from getting stuck in the first intersecting portions 7, thereby, it is possible that the stone biting resistance performance is improved.

Each of the first projecting portions 10 in this embodiment includes a pair of projections 14 arranged to be spaced apart from each other along the center line (5c) of respective one of the first inclined portions 5. Thereby, the center position (10c) of each of the first projecting portions 10 in this embodiment is the center position between the pair of projections 14 along the center line (5c) of respective one of the first inclined portions 5.

It is preferred that each of the pair of the projections 14 of each of the first projecting portions 10 has a substantially rectangular shape elongated in the groove width direction of respective one of the first inclined portions 5 in a plan view of the tread portion. That is, each of the projections 14 has a length L4 extending in the groove width direction of the respective first inclined portion 5 and a width W1 along the center line (5c) of the respective first inclined portion 5, and the width W1 of each of the projections 14 is smaller than the length L4 of each of the projections 14.

It is preferred that the width W1 of each of the projections 14 is in the range of from 20% to 30% of the length L4 of each of the projections 14. Further, it is preferred that a distance L5 between the projections 14 in each pair thereof is in the range of from 45% to 80% of a groove width w2 of each of the first inclined portions 5. The first projecting portions 10 configured as such can improve the on-snow performance and the stone biting resistance performance of the tire 1 in a good balance.

It is preferred that each of the projections 14 is arranged at an angle θ in the range of from 80 to 100 degrees with respect to the center line (5c) of respective one of the first inclined portions 5. By the projections 14 configured as such, large edge effects are exerted in a direction of the traction when running on a snowy road surface, therefore, it is possible that the on-snow performance of the tire 1 is further improved.

It is preferred that a height (H) of each of the projections 14 is in the range of from 10% to 30% of a groove depth (D) of each of the first inclined portions 5. If the height (H) of each of the projections 14 is smaller than 10% of the groove depth (D) of each of the first inclined portions 5, it is possible that the stone biting resistance performance is not improved. Further, if the height (H) of each of the projections 14 is larger than 30% of the groove depth (D) of each of the first inclined portions 5, the rigidity of the projections 14 is insufficient, therefore, it is possible that the edge effects are not exerted.

It is preferred that a stone ejector 15 is formed at an end portion (5e) on a side of respective one of the second intersecting portions 8 of a groove wall 5B of each of the first inclined portions 5. The stone ejector 15 of each of the first inclined portions 5 is formed in a stepwise shape by two step portions having different heights from a groove bottom 5A of the respective first inclined portion 5, for example. The first inclined portions 5 provided with the stone ejectors 15 configured as such can discharge stones and the like stuck in the second intersecting portions 8 at an early stage, therefore, it is possible that the stone biting resistance performance is improved.

The projecting portions 9 may further include second projecting portions 16 each arranged in respective one of the second inclined portions 6. Each of the second projecting portions 16 in this embodiment includes a pair of projections 17 arranged to be spaced apart from each other along the center line (6c) of respective one of the second inclined portions 6. The projecting portions 9 configured as such include the first projecting portions 10 and the second projecting portions 16 arranged on both sides of the first intersecting portions 7, therefore, it is possible that stones and the like are more reliably suppressed from getting stuck in the first intersecting portions 7, thereby, it is possible that the stone biting resistance performance is further improved. It is preferred that the shape of each of the projections 17 of the second projecting portions 16 is similar to the shape of each of the projections 14 of the first projecting portions 10.

It is preferred that the number of the projections 14 of the first projecting portions 10 and the number of the projections 17 of the second projecting portions 16 are the same. In this embodiment, each of the first inclined portions 5 is provided with one first projecting portion 10, and each of the second inclined portions 6 is provided with one second projecting portion 16. Thereby, in this embodiment, the number of the projections 14 of the first inclined portions 5 and the number of the projections 17 of the second inclined portions 6 are the same. The first projecting portions 10 and the second projecting portions 16 configured as such increase the rigidity of the land regions 4 in a good balance, therefore, it is possible that the steering stability of the tire 1 is improved.

It is preferred that a stone ejector 18 is formed at an end portion (6e) on a side of respective one of the second intersecting portions 8 of a groove wall 6B of each of the second inclined portions 6. It is preferred that the stone ejector 18 of each of the second inclined portions 6 is formed in the stepwise shape by two step portions just like the stone ejector 15 of each of the first inclined portions 5, for example. The second inclined portions 6 provided with the stone ejectors 18 configured as such can discharge stones and the like stuck in the second intersecting portions 8 at an early stage, therefore, it is possible that the stone biting resistance performance is improved.

Figure 5:
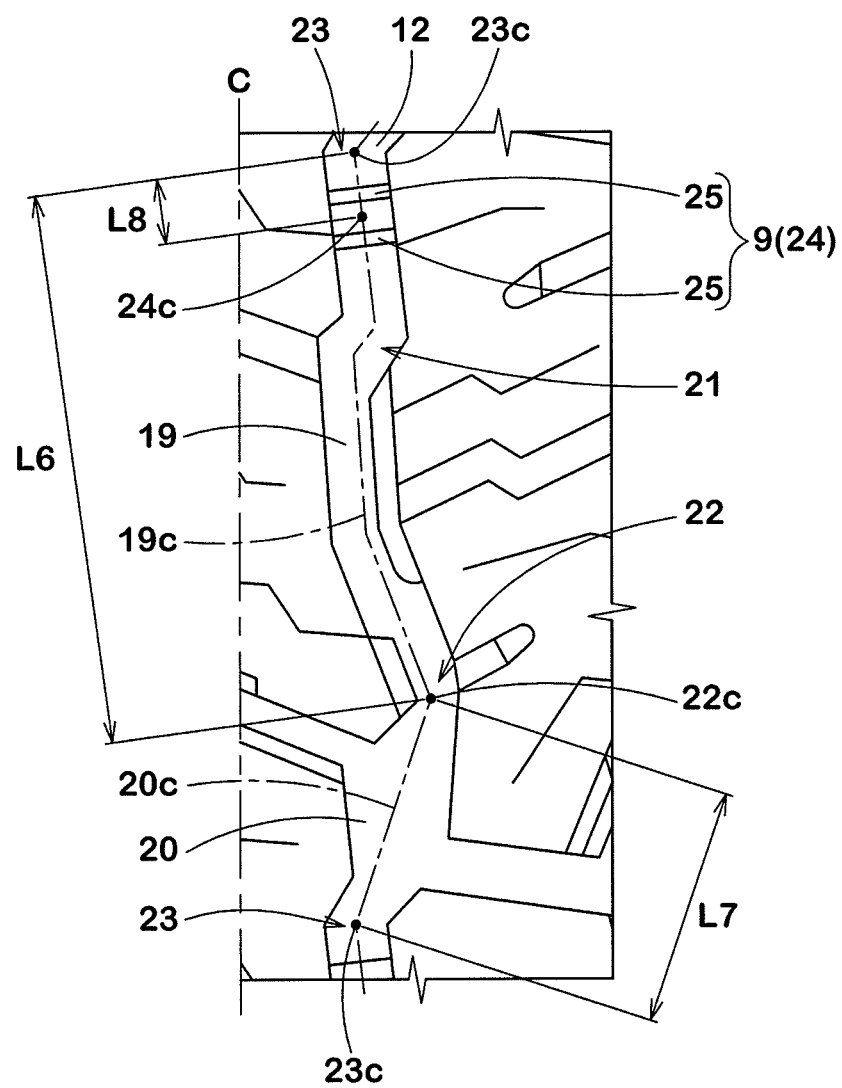
FIG. 5 is an enlarged partial view of one of crown main grooves of FIG. 1.

FIG. 5 is an enlarged partial view of one of the crown main grooves 12 of FIG. 1. As shown in FIG. 5, it is preferred that each of the crown main grooves 12 in this embodiment has third inclined portions 19 and fourth inclined portions 20 arranged alternately in the tire circumferential direction, wherein the third inclined portions 19 are inclined in the first direction with respect to the tire circumferential direction and the fourth inclined portions 20 are inclined in the second direction with respect to the tire circumferential direction. Each of the third inclined portions 19 includes a third bent portion 21, for example. It is preferred that the third bent portion 21 has a size that does not hinder the movement of the snow in the respective third inclined portions 19 in a longitudinal direction thereof.

Each of the crown main grooves 12 in this embodiment has, as portions connecting between the third inclined portions 19 and the fourth inclined portions 20, third intersecting portions 22 protruding most outwardly in the tire axial direction and fourth intersecting portions 23 protruding most inwardly in the tire axial direction. It is preferred that the third intersecting portions 22 and the fourth intersecting portions 23 are arranged alternately in the tire circumferential direction. With the crown main grooves 12 configured as such, when running on a snowy road surface, snow in each of the crown main grooves 12 is compressed toward the respective third intersecting portion 22 and the respective fourth intersecting portion 23, therefore, it is possible that hard snow blocks are formed.

In this embodiment, a length L6 of each of the third inclined portions 19 is larger than a length L7 of each of the fourth inclined portions 20. Here, the length L6 of each of the third inclined portions 19 is the distance between a center position (22c) of the third intersecting portion 22 and a center position (23c) of the fourth intersecting portion 23 in the each of the third inclined portions 19. Further, the length L7 of each of the fourth inclined portions 20 is the distance between the center position (22c) of the third intersecting portion 22 and the center position (23c) of the fourth intersecting portion 23 in the each of the fourth inclined portions 20.

Note that the center position (22c) of each of the third intersecting portions 22 is an intersection point of a center line (19c) of the third inclined portion 19 and a center line (20c) of the fourth inclined portion 20 in the each of the third intersecting portions 22. Further, the center position (23c) of each of the fourth intersecting portions 23 is an intersection point of the center line (19c) of the third inclined portion 19 and the center line (20c) of the fourth inclined portion 20 in the each of the fourth intersecting portions 23. The crown main grooves 12 configured as such can generate large snow shearing force by the third inclined portions 19 and the fourth inclined portions 20 having different angles with respect to the tire circumferential direction.

The projecting portions 9 may further include third projecting portions 24 arranged in the third inclined portions 19. It is preferred that a distance L8 between one of the third projecting portion 24 and its adjacent one of the fourth intersecting portions 23 is not more than 30% of the length L6 of each of the third inclined portions 19. Here, the distance L8 between one of the third projecting portions 24 and its adjacent one of the fourth intersecting portions 23 is the distance between a center position (24c) of one of the third projecting portions 24 and the center position (23c) of its adjacent one of the fourth intersecting portions 23.

Note that the center position (24c) of each of the third projecting portions 24 is the center position of the each of the third projecting portions 24 along the center line (19c) of respective one of the third inclined portions 19 and is the point on the center line (19c) of the respective third inclined portion 19. The third projecting portions 24 configured as such are formed near the fourth intersecting portions 23, therefore, it is possible that stones and the like are suppressed from getting stuck in the fourth intersecting portions 23, thereby, it is possible that the stone biting resistance performance is improved.

Each of the third projecting portions 24 in this embodiment includes a pair of projections 25 arranged to be spaced apart from each other along the center line (19c) of respective one of the third inclined portions 19. Thereby, the center position (24c) of each of the third projecting portions 24 in this embodiment is the center position between the pair of projections 25 along the center line (19c) of respective one of the third inclined portions 19.

As shown in FIG. 1, each of the land regions 4 in this embodiment is divided into a plurality of blocks 27 by lateral grooves 26 each connecting between adjacent ones of the main grooves 3. It is preferred that each of the blocks 27 of each of the land regions 4 is provided with a plurality of sipes 28. The sipes 28 include open sipes 30. Each of the open sipes 30 is connected at a connecting portion 29 thereof with one of the main grooves 3.

Each of the projecting portions 9 in this embodiment is formed in the vicinity of the connecting portion 29 of one of the sipes 28. Here, "vicinity" is within 25% of one of the pitch lengths (P). That is, it is preferred that each of the projecting portions 9 is formed at a position within a distance not more than 25% of one of the pitch lengths (P) from the connecting portion 29 of one of the sipes 28 adjacent to the each of the projecting portions 9. The projecting portions 9 configured as such can suppress stones and the like from getting stuck in the main grooves 3 caused by the deformation of the blocks 27 of the land regions 4 due to the connecting portions 29 of the sipes 28, therefore, it is possible that the stone biting resistance performance is improved.

While detailed description has been made of the tire as an especially preferred embodiment of the present invention, the present invention can be embodied in various forms without being limited to the illustrated embodiment.

Working Example (Example)

Tires having the tread pattern shown in FIG. 1 were made by way of test according to the specification listed in Table 1. These test tires were mounted on all wheels of a test car and tested for the stone biting resistance performance and the on-snow performance. Common specifications of each of the test tires and test methods are as follows.

Test car: large SUV
Tire size: 265/70R17
Rim size: 17×7.57
Tire inner pressure: 240 kPa <Stone Biting Resistance Performance>

The test car on which the test tires were mounted was driven on a rough road on which stones, rubble, and the like were scattered for 1500 km and then the amount of stones and the like stuck in the main grooves was measured. The results are indicated by an index based on a reciprocal of the measured amount of Reference 1 being 100, wherein the larger the numerical value, the better the stone biting resistance performance is.

<On-Snow Performance> while the test car with the test tires mounted thereon was driven on a road covered with compacted snow, driving force and braking force were measured by a testing machine mounted on the test car. The results are indicated by an index each based on the Reference 1 being 100, wherein the larger the numerical value, the better the on-snow performance is.

Test results are shown in Table 1.

TABLE 1

|  | Ref. 1 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Presence (P) or Absence (A) of First projecting portions | A | P | P | P | P | P | P | P | P | P |
| Presence (P) or Absence (A) of Second projecting portions | A | P | A | P | P | P | P | P | P | P |
| Presence (P) or Absence (A) of Stone injectors | A | P | A | A | P | P | P | P | P | P |
| Number of Projections in each of Projecting portions | 0 | 2 | 2 | 2 | 1 | 2 | 2 | 2 | 2 | 2 |
| Distance L3 between First projecting portion and First intersecting portion/Length L1 of First inclined portion [%] | — | 10 | 10 | 10 | 10 | 20 | 30 | 10 | 10 | 10 |
| Height (H) of Projection/Groove depth (D) of Main groove [%] | — | 20 | 20 | 20 | 20 | 20 | 20 | 10 | 30 | 20 |
| Angle θ of Projection with respect to longitudinal direction of Main groove [degree] | — | 90 | 90 | 90 | 90 | 90 | 90 | 90 | 90 | 80 |
| Stone biting resistance performance [index] | 100 | 135 | 120 | 125 | 110 | 130 | 125 | 115 | 140 | 135 |
| On-snow performance [index] | 100 | 120 | 115 | 120 | 105 | 120 | 120 | 110 | 110 | 115 |

From the test results, it was confirmed that the tires as Examples were excellent in the stone biting resistance performance and the on-snow performance as compared with the tires as the Reference.

The invention claimed is:

1. A tire comprising:
a tread portion comprising at least one main groove extending in a zigzag manner in a tire circumferential direction, wherein
the main groove includes first inclined portions and second inclined portions arranged alternately in the tire circumferential direction,
the first inclined portions are inclined in a first direction with respect to the tire circumferential direction and the second inclined portions are inclined in a second direction opposite to the first direction with respect to the tire circumferential direction,
a length of each of the first inclined portions is larger than a length of each of the second inclined portions,
a width of the main groove widens in a part of each of the second inclined portions,
the main groove is provided in a groove bottom thereof with projecting portions extending in a groove width direction of the main groove,
the projecting portions include first projecting portions arranged in the first inclined portions,
the projecting portions include second projecting portions arranged in the second inclined portions,
the first projecting portions each include a number of projections,
the second projecting portions each include a number of projections, and
the number of projections of each of the first projecting portions and the number of projections of each of the second projecting portions are the same.

2. A tire comprising:
a tread portion comprising at least one main groove extending in a zigzag manner in a tire circumferential direction, wherein
the main groove includes first inclined portions and second inclined portions arranged alternately in the tire circumferential direction,
the first inclined portions are inclined in a first direction with respect to the tire circumferential direction and the second inclined portions are inclined in a second direction opposite to the first direction with respect to the tire circumferential direction,
a length of each of the first inclined portions is larger than a length of each of the second inclined portions,
a width of the main groove widens in a part of each of the second inclined portions,
the main groove is provided in a groove bottom thereof with projecting portions extending in a groove width direction of the main groove,
the projecting portions include first projecting portions arranged in the first inclined portions,
each of the first projecting portions includes a pair of projections arranged to be spaced apart from each other in a direction along a center line of a respective one of the first inclined portions,
the projecting portions include second projecting portions arranged in the second inclined portions,
each of the second projecting portions includes a pair of projections arranged to be spaced apart from each other in a direction along a center line of a respective one of the second inclined portions, and each of the first inclined portions and the second inclined portions is provided with only two projections.

3. The tire according to claim 2, wherein
the main groove has first intersecting portions each connecting between one of the first inclined portions and one of the second inclined portions adjacent thereto,
a distance between one of the first projecting portions and one of the first intersecting portions adjacent thereto is not more than 30% of the length of each of the first inclined portions.

4. The tire according to claim 3, wherein
the main groove has second intersecting portions each connecting between one of the first inclined portions and one of the second inclined portions adjacent thereto on an inner side in a tire axial direction of the first intersecting portions, and
each of the second inclined portions has a stone ejector formed at an end portion of a groove wall thereof on a side of a respective one of the second intersecting portions.

5. The tire according to claim 4, wherein
the stone ejector is formed in a stepwise shape.

6. The tire according to claim 2, wherein
a distance between the projections of the first projecting portions in each pair thereof is in a range of from 45% to 80% of a groove width of each of the first inclined portions.

7. The tire according to claim 2, wherein
each of the projections of the first projecting portions is arranged at an angle in a range of from 80 to 100 degrees with respect to the center line of a respective one of the first inclined portions.

8. The tire according to claim 2, wherein
each of the projections of the first projecting portions has a substantially rectangular shape elongated in the groove width direction of a respective one of the first inclined portions in a plan view of the tread portion, and
a width of each of the projections of the first projecting portions is in a range of from 20% to 30% of a length of each of the projections.

9. The tire according to claim 2, wherein
a height of each of the projections of the first projecting portions is in a range of from 10% to 30% of a groove depth of each of the first inclined portions.

10. The tire according to claim 2, wherein
the tread portion has land regions divided by the main groove,
the land regions are provided with sipes each connected at a connecting portion respectively thereof with the main groove, and
each of the projecting portions is provided in the vicinity of the connecting portion of one of the sipes.

11. The tire according to claim 10, wherein
the main groove has predetermined pitch lengths each including a pair of the first inclined portion and the second inclined portion,
each of the projecting portions is provided at a position within 25% of one of the pitch lengths from the connecting portion of one of the sipes adjacent thereto.

12. The tire according to claim 11, wherein
the pitch lengths include plural types of pitch lengths having different lengths and being randomly arranged.

13. The tire according to claim 2, wherein
the main groove has first intersecting portions each connecting between one of the first inclined portions and one of the second inclined portions adjacent thereto,
a distance between one of the first projecting portions and one of the first intersecting portions adjacent thereto is not more than 30% of the length of each of the first inclined portions,
the main groove has second intersecting portions each connecting between one of the first inclined portions and one of the second inclined portions adjacent thereto on an inner side in a tire axial direction of the first intersecting portions,
each of the second inclined portions has a stone ejector formed at an end portion of a groove wall thereof on a side of a respective one of the second intersecting portions,
the groove wall of each of the second inclined portions is not provided with the stone ejector except for the end portion, and
the stone ejector protrudes toward the center line of the respective second inclined portion from the groove wall of the part of the respective second inclined portion in which the stone ejector is not provided.

14. The tire according to claim 2, wherein
each of the first inclined portions has a narrow portion,
in each of the first inclined portions, the narrow portion has a width smaller than each of widths of parts of the first inclined portion directly adjacent to the narrow portion on both sides in a direction along the center line of the first inclined portion, and
the first projecting portions are arranged in the narrow portion.

15. The tire according to claim 2, wherein
each of the first inclined portions includes a first bent portion, and
the first bent portion is bent in a crank shape.

16. The tire according to claim 2, wherein
the at least one main groove is a plurality of the main grooves, and
the main grooves include a shoulder main groove arranged on a tread edge side and a crown main groove arranged on a tire equator side of the shoulder main groove.

17. A tire comprising:
a tread portion comprising at least one main groove extending in a zigzag manner in a tire circumferential direction, wherein
the main groove includes first inclined portions and second inclined portions arranged alternately in the tire circumferential direction,
the first inclined portions are inclined in a first direction with respect to the tire circumferential direction and the second inclined portions are inclined in a second direction opposite to the first direction with respect to the tire circumferential direction,
a length of each of the first inclined portions is larger than a length of each of the second inclined portions,
a width of the main groove widens in a part of each of the second inclined portions,
the main groove is provided in a groove bottom thereof with projecting portions extending in a groove width direction of the main groove,
the projecting portions include first projecting portions arranged in the first inclined portions,
the main groove has first intersecting portions each connecting between one of the first inclined portions and one of the second inclined portions adjacent thereto, a distance between one of the first projecting portions and one of the first intersecting portions adjacent thereto is not more than 30% of the length of each of the first inclined portions, the main groove has second intersecting portions each connecting between one of the first inclined portions and one of the second inclined portions adjacent thereto on an inner side in a tire axial direction of the first intersecting portions, each of the second inclined portions has a stone ejector formed at an end portion of a groove wall thereof on a side of a respective one of the second intersecting portions, the groove wall of each of the second inclined portions is not provided with the stone ejector except for the end portion, each of the first inclined portions has a stone ejector formed at an end portion of a groove wall thereof on a side of a respective one of the second intersecting portions, the groove wall of each of the first inclined portions is not provided with the stone ejector except for the end portion, and the stone ejector protrudes toward a center line of a respective one of the first inclined portions and the second inclined portions from the groove wall of the part of the respective first inclined portion or the respective second inclined portion in which the stone ejector is not provided.

18. The tire according to claim 17, wherein each of the first projecting portions includes a pair of projections arranged to be spaced apart from each other in a direction along a center line of a respective one of the first inclined portions.

19. The tire according to claim 17, wherein the projecting portions include second projecting portions arranged in the second inclined portions.

* * * * *